Nov. 5, 1963  D. J. McCONNELL  3,109,327
INDEXING DEVICE FOR SAW GRINDING MACHINE
Filed Aug. 1, 1961  4 Sheets-Sheet 1
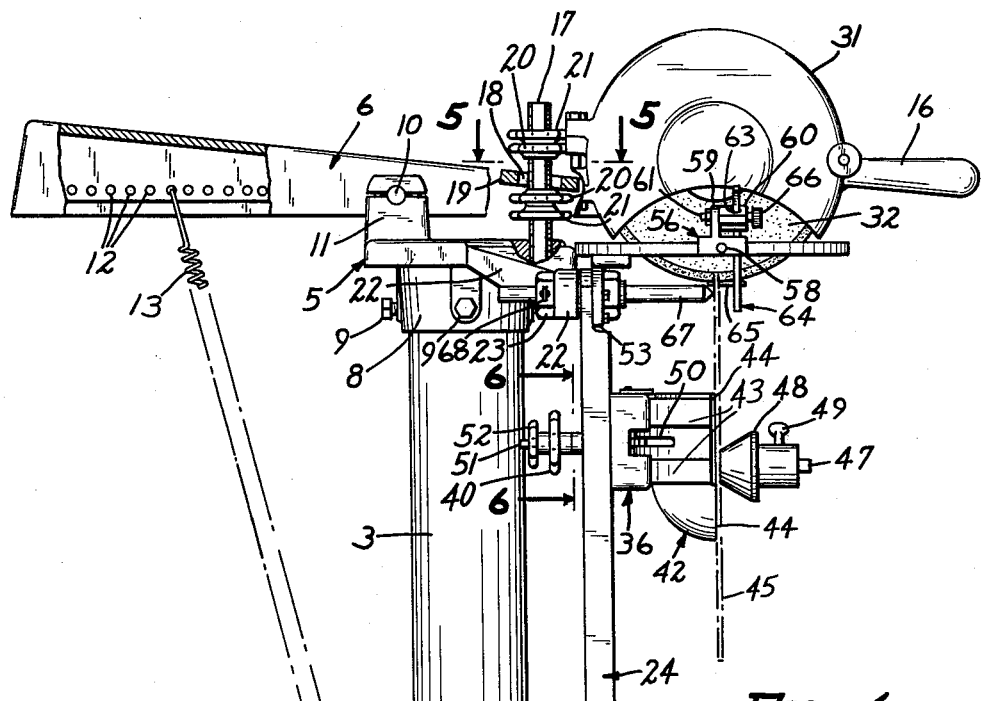
FIG. 1
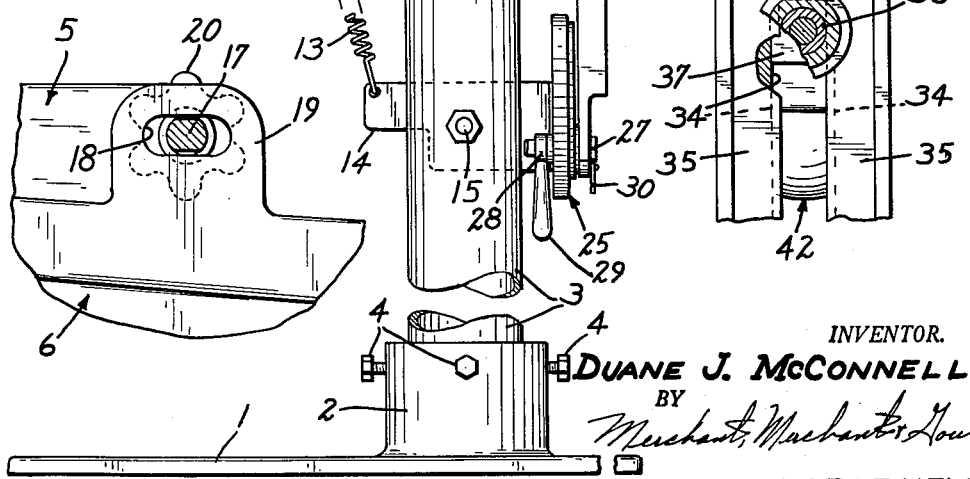
FIG. 5
FIG. 6
INVENTOR.
DUANE J. McCONNELL
BY
Merchant, Merchant & Gould
ATTORNEYS Nov. 5, 1963  D. J. McCONNELL  3,109,327
INDEXING DEVICE FOR SAW GRINDING MACHINE
Filed Aug. 1, 1961  4 Sheets-Sheet 2

INVENTOR.
DUANE J. McCONNELL
BY
Merchant, Merchant & Gould
ATTORNEYS

Nov. 5, 1963  D. J. McCONNELL  3,109,327
INDEXING DEVICE FOR SAW GRINDING MACHINE
Filed Aug. 1, 1961  4 Sheets-Sheet 3

INVENTOR.
DUANE J. McCONNELL
BY
Merchant, Merchant + Gould
ATTORNEYS

Nov. 5, 1963  D. J. McCONNELL  3,109,327
INDEXING DEVICE FOR SAW GRINDING MACHINE
Filed Aug. 1, 1961  4 Sheets-Sheet 4

INVENTOR.
DUANE J. McCONNELL
BY
Merchant, Merchant & Gould
ATTORNEYS

United States Patent Office 3,109,327
Patented Nov. 5, 1963

3,109,327
INDEXING DEVICE FOR SAW GRINDING MACHINE
Duane J. McConnell, Minneapolis, Minn., assignor to Foley Manufacturing Company, Minneapolis, Minn., a corporation of Minnesota
Filed Aug. 1, 1961, Ser. No. 128,408
7 Claims. (Cl. 76—40)

My invention relates generally to saw sharpening machines, and more particularly to improvements in such machines as employ abrasive grinding wheels to sharpen the teeth of saws.

For the purpose of obtaining uniform and efficient cutting of material to be sawed and for maintaining balance in saws, particularly power operated saws, it is highly important that the teeth of the saw, or groups of teeth thereof, are of a given uniform shape and arrangement, and that like teeth are sharpened uniformly. Hence, an important object of my invention is the provision of an indexing device which may be readily attached to a saw sharpening or grinding machine, and by means of which the teeth of the saw are properly indexed in a given succession, with respect to the path of movement of an abrasive wheel toward and away from grinding contact with the teeth of the saw.

Another object of my invention is the provision of an indexing device which is adjustable relative to the abrasive wheel in a manner to properly index the saw in any given angular position of the saw relative to the abrasive wheel.

Another object of my invention is the provision of an indexing device as set forth, that is quickly and easily adjusted to properly index saws of various sizes.

Still another object of my invention is the provision of an indexing device which will properly index saws having various tooth forms.

Another object of my invention is the provision of a saw grinder having adjustable saw supporting means and an indexing device of the above type mounted on the saw supporting means for common adjustment therewith relative to a grinding wheel.

Another object of my invention is the provision of an indexing device which is simple and inexpensive to produce and install on new or existing saw grinding or sharpening machines, which is highly efficient and accurate in operation, and which is rugged in construction and durable in use.

The above, and still further highly important objects and advantages of my invention, will become apparent from the following detailed specification, appended claims and attached drawings.

Referring to the drawings, which illustrate the invention, and in which like reference characters indicate like parts throughout the several views:

FIG. 1 is a view in side elevation of a saw grinding machine and saw indexing means, produced in accordance with my invention, some parts being broken away and some parts being shown in section;

FIG. 5 is a fragmentary horizontal section taken substantially on the line 5—5 of FIG. 1;

FIG. 6 is an enlarged fragmentary detail, partly in rear elevation and partly in section, taken substantially on the line 6—6 of FIG. 1;

Figure 2:
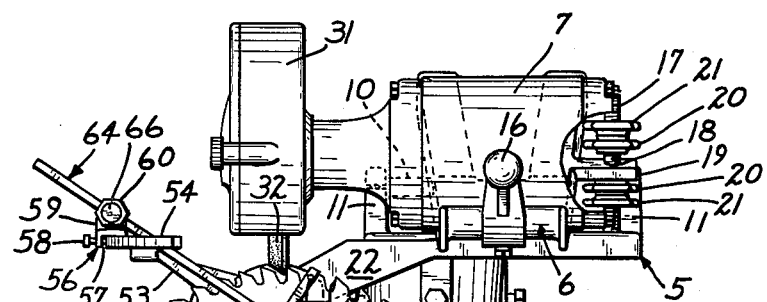
FIG. 2 is a fragmentary view in front elevation, some parts being broken away.
Figure 8:
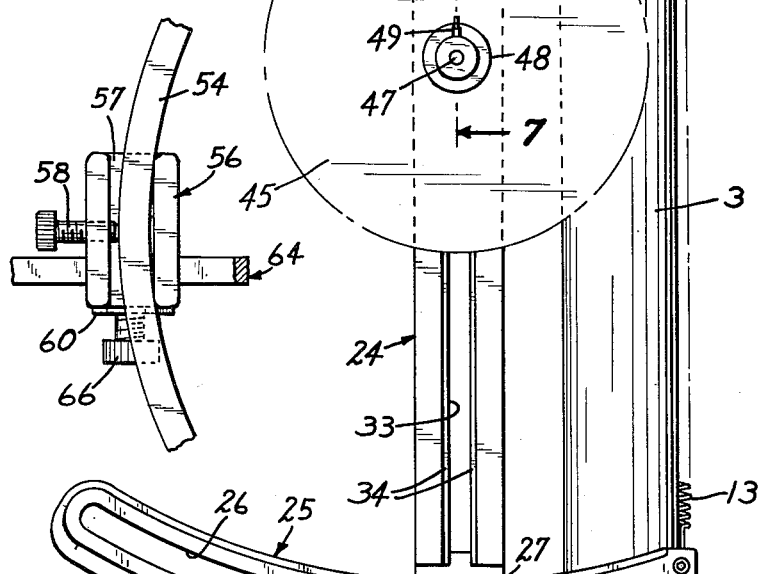
FIG. 8 is an enlarged fragmentary view in bottom plan of the saw indexing means of my invention.

Referring with greater detail to the drawings, a saw grinding machine is shown as comprising, an enlarged plate-like foot 1 having an upwardly opening socket or the like 2, an upright standard 3 having its lower end received in the socket 2 and anchored therein by set screws or the like 4, a base member 5 at the upper end of the standard 3, a motor mounting cradle 6, and a grinding wheel equipped motor 7 supported by the cradle 6. The base member 5 is provided with a downwardly opening socket portion 8 which receives the upper end of the standard 3, set screws 9 being screw threaded into the socket 8 to securely hold the base member 5 on the upper end of the standard 3. The cradle 6, intermediate its ends, is provided with axially aligned horizontal trunnions 10, one of which is shown in FIG. 1, that are journalled in upstanding bearing members 11 at opposite sides of the base member 5, whereby the motor 7, carried by the front end portion of the cradle 6, may be moved generally upwardly and downwardly. Rearwardly of the trunnions 10, the cradle 6 is provided with a plurality of openings 12 for reception of one end of an elongated coil tension spring 13, the opposite end of which is hooked or otherwise secured to an anchoring bracket 14 mounted on the standard 3 by means of a nut-equipped screw or the like 15. At its front end, the cradle 6 is provided with a handle 16 by means of which the front end of the cradle 6 and the motor 7 carried thereby may be moved downwardly against yielding bias of the counter-balancing spring 13.

For the purpose of limiting swinging movements of the cradle 6 in opposite directions, a vertically disposed stud 17 is anchored at its lower end in the base member 5, the stud 17 extending upwardly through an opening 18 through a laterally outwardly projecting lug 19 integrally formed with a cradle 6. Screw threaded on the stud 17 are stop nuts 20 and cooperating locking nuts 21. The stop nuts 20 are adjustable on the stud 17 to vary the range of swinging movement of the motor 7, the lock nuts 21 being utilized to lock the stop nuts 20 against accidental rotation.

The base member 5 is formed to provide a laterally outwardly projecting arm 22, to the outer end of which is pivotally secured a nut-equipped hollow pivot bolt 23 which extends through and pivotally supports the upper end of a depending saw mounting leg 24 for swinging movements on a horizontal axis normal to the axis of the trunnions 10. The leg 24 is adapted to be locked in different selected positions of its swinging movement to a quadrant element 25 that is bolted or otherwise rigidly secured at one end to the anchoring bracket 14. The quadrant element 25 is provided with an arcuate slot 26 which slidably receives a locking bolt 27 that extends rearwardly from the lower end of the leg 24, the rear end of the bolt 27 being screw threaded through a locking nut 28 that is provided with a handle 29 for easy operation. As shown in FIG. 2, the quadrant element 25 is provided with indicia denoting circular degrees, the lower end of the leg 24 having thereon a pointer 30 which cooperates with the indicia to indicate the selected angular relationship of the leg 24 with respect to the vertical.

Figure 7:
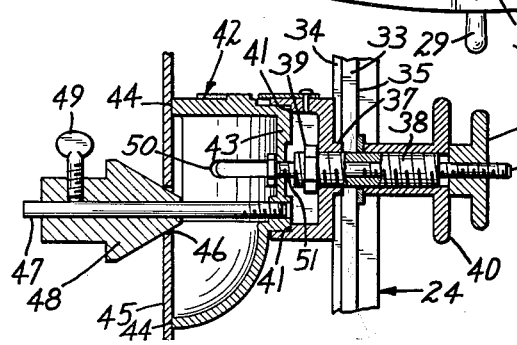
FIG. 7 is an enlarged fragmentary section taken substantially on the line 7—7 of FIG. 2.

The casing of the grinder motor 7 is formed to provide a hood 31 which overlies the grinding wheel, said wheel being indicated at 32. Preferably, the grinding wheel 32 is disposed in the vertical plane of the axis of swinging movement of the leg 24, for a purpose which will hereinafter become apparent. The leg 24 is formed to provide a longitudinally extended central slot 33, the front portion of the leg 24 defining parallel guideways 34 at opposite sides of the slot 33, the rear portion of the leg 24 defining rearwardly facing shoulders 35 at opposite sides of the slot 33. A carrier element 36 is mounted for longitudinal sliding movements on the front surface of the leg 24, said carrier element 36 having a rearwardly projecting cross sectionally square boss 37 which slidingly seats in the guideways 34 to hold the carrier 36 against rotation relative to the leg 24. A tubular mounting stud 38 is screw threaded through the rear portion of the carrier element 36 and axially through the boss 37 and is anchored against rotation relative to the carrier element 36 by a lock nut 39. The tubular stud 38 extends rearwardly through the slot 33, and is provided with a washer equipped locking nut 40 that operatively engages the shoulders 35 to releasably clamp the carrier element 36 against longitudinal sliding movement on the leg 24, see particularly FIG. 7. The carrier element 36 is formed to provide an arcuate guideway 41 for a saw holding member 42 that is formed with a semi-cylindrical portion 43 slidably seated in the guideway 41. As shown in FIG. 7, the saw holding member 42 is generally cup-shaped, having a marginal portion 44 that is adapted to engage one side of a circular saw 45 in radially outwardly spaced relation to a central aperture 46 in the saw 45. The saw holding member 42 is further provided with a forwardly extending shaft 47 that is adapted to extend through the saw opening 46, and has axially slidably mounted thereon a conical centering member 48 that is adapted to be partially received in the central opening 46 of the saw 45, and which is releasably locked against sliding movements on the shaft 47 by a thumb screw or the like 49. The semi cylindrical portion 43 of the saw holding member 42 is provided with a circumferentially extended slot 50 through which rearwardly extends a lock bolt 51, the lock bolt 51 further extending axially through the tubular stud 38 and having screw threaded on the rear end portion thereof a threaded hand wheel or locking nut 52. As shown in FIG. 7, the handwheel 52 is adapted to engage the clamping nut 40 to releasably lock the holding member 42 in the guideway 41 and against pivotal movement with respect to the carrier element 36. Preferably, the construction of the saw holding member 42 is such that the axis of the semi-cylindrical portion 43 is disposed substantially in the plane of the marginal edge 44 whereby, when the handwheel 52 is loosened, the saw holding member 42 and saw 45, carried thereby, may be pivoted about a center line coplanar with the saw 45. With the carrier element positioned as shown in FIGS. 1, 3, 4 and 7, this center line or axis of pivotal movement of the saw holding member 42 is disposed parallel to the leg 24. By loosening the handwheel 52 and nut 40, the carrier element 36 may be moved forwardly out of engagement of the boss 37 thereof with the guideways 34, and rotated 90°, and thereafter moved rearwardly into engagement of the boss 37 with the guideways 34 and locked in place; in which rotated position of the carrier element 36, the axis of rotation of the saw holding member 42 will be disposed in a direction normal to the longitudinal dimension of the leg 24, as shown in FIGS. 9 and 10.

For the purpose of properly indexing the teeth of the saw 45, whereby the teeth may be uniformly sharpened by the grinding wheel 32, I provide novel indexing means and supporting bracket means therefor, now to be described. The mounting bracket means comprises a bracket element 53 that is rigidly secured to the upper end portion of the leg 24 and a horizontally disposed arcuate mounting member or bar 54 bolted or otherwise rigidly secured to the bracket element 53, as indicated at 55. The bar 54 is so disposed that the axis of the arc defined thereby is substantially parallel to the longitudinal dimension of the leg 24 and substantially coincidental with the axis of the semi-cylindrical wall 43 of the saw holding member 42 when said member 42 is disposed as shown in FIGS. 1, 3, 4 and 7. Mounted for sliding movements on the arcuate bar 54 is a slide 56 defining a downwardly opening channel 57 in its bottom portion for reception of the arcuate bar 54. The slide 56 is adapted to be adjustably moved longitudinally of the arcuate bar 54, and is provided with a set screw or the like 58 by means of which the slide 56 is releasably locked against movement on the arcuate mounting bar 54. The slide 56 is further provided intermediate its ends with an upstanding lug 59 which carries a mounting element 60. The mounting element 60 has integrally formed therewith an axially extending stud portion 61 that extends through a suitable opening in the lug 59 whereby the mounting element 60 rotates freely on a horizontal axis, the stud 61 being provided with a retaining nut 62. The mounting element 60 is provided with a transverse opening 63 in which is longitudinally slidably mounted an elongated tooth indexing member 64 the inner end of which is provided with a saw tooth-engaging element in the nature of a pin or the like 65. A set screw or the like 66 is screw threaded into the mounting element 60 to releasably lock the indexing member 64 in any desired position of its movement relative to the mounting element 60.

Figure 3:
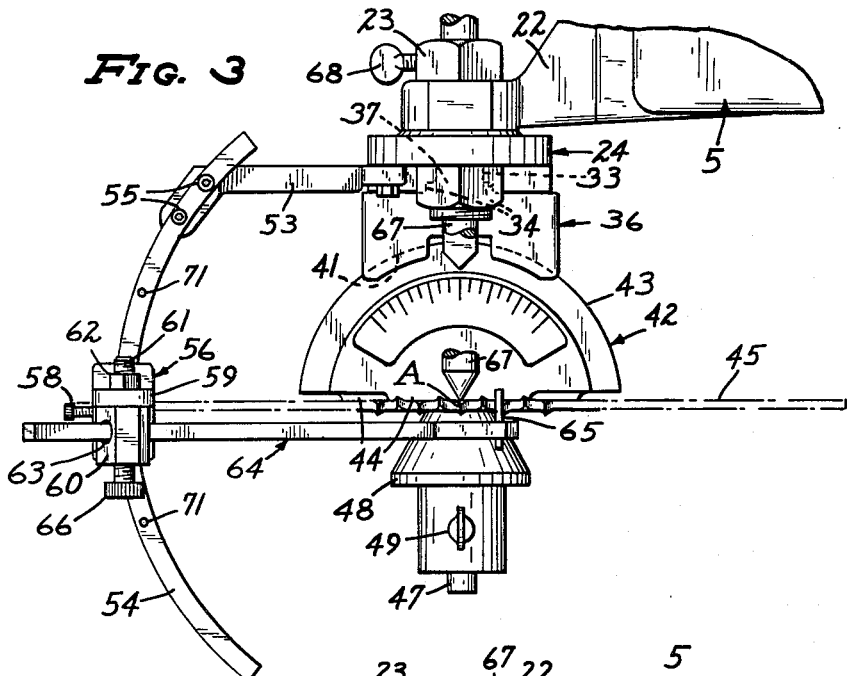
FIG. 3 is an enlarged fragmentary view in top plan of the saw mounting means and indexing means of my invention.
Figure 4:
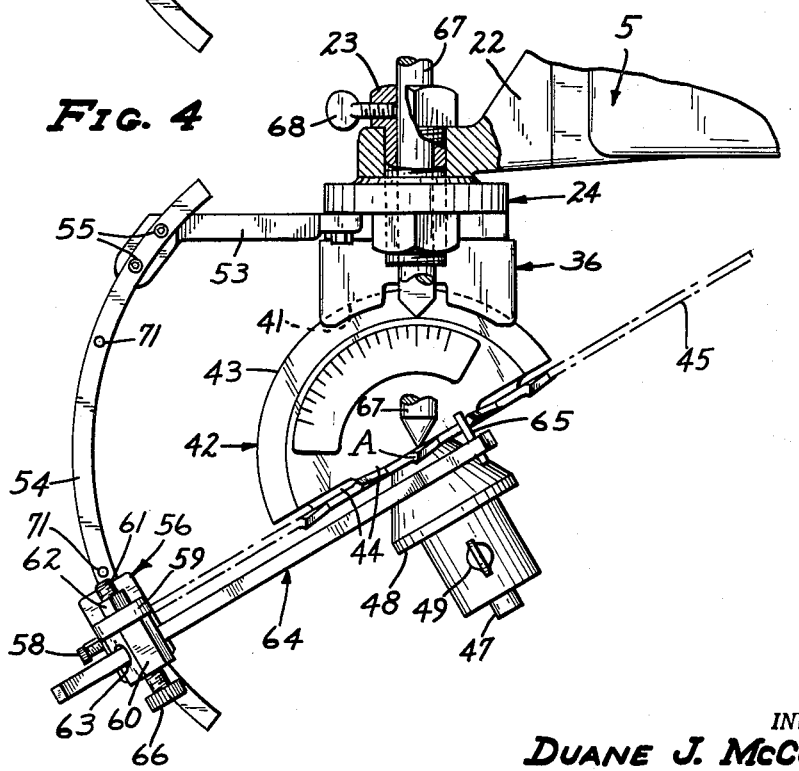
FIG. 4 is a view corresponding to FIG. 3, but showing a different position of some of the parts.

With the saw grinding machine arranged as above described, the same is adapted to grind the leading or cutting faces or edges of the saw teeth, said leading faces or edges being indicated at A in FIG. 2. The saw 45 to be sharpened, is mounted on the shaft 47 in engagement with the marginal edge portion 44 of the saw holding portion 42, and centered with respect to the shaft 47 by the conical centering member 48. The carrier element 36 is then adjusted longitudinally of the leg 24 until the cutting teeth at the upper portion of the saw 45 are disposed just above a stop pin 67 that extends axially through the tubular pivot bolt 23. The stop pin 67 is moved forwardly into engagement with the saw blade 45 and is locked in place by a thumb screw 68 screw threaded in the head of the tubular bolt 23. The leg 24 is positioned relative to the quadrant element 25 and the saw holding member 42 positioned relative to the carrier element 36 to provide the proper rake angles to the leading edges A of the saw 45. The lower one of the stop nuts 20 is adjusted to properly limit downward movement of the motor 7 and grinding wheel 2 carried thereby, and the slide 56 is moved on the arcuate bar 54 to bring the indexing member 64 into parallel relationship with the saw blade 45, as shown in FIGS. 3 or 4. The indexing member 64 is then adjusted relative to its mounting element 60 so that the tooth-engaging element 65 engages the leading edge A of one of the teeth of the saw 45 to locate an adjacent tooth in the desired position relative to the grind wheel 32, circumferentially of the saw blade 45. The operator then grasps the handle 16 of the cradle 6 and moves the saw 7 and grinding wheel 32 downwardly against bias of the spring 13, whereby the leading face A of the tooth adjacent the grinding wheel 32 will be ground. Thereafter, when the motor and grinding wheel are raised, the operator moves the saw blade manually in a clockwise direction with respect to FIG. 2 to bring a succeeding tooth into position to be ground. During this clockwise movement of the saw blade 45, the tooth engaging element 65 rides over the trailing face portions of one or more teeth until the next tooth to be sharpened is moved just beyond its proper sharpening position, whereupon the tooth-engaging element 65 will fall into the gullet between adjacent teeth. The operator then moves the saw blade 45 counterclockwise with respect to FIG. 2 until the tooth-engaging element 65 engages the leading face A of one of the teeth, whereupon the next tooth to be ground is accurately positioned with respect to the path of downward movement of the grinding wheel 32. In the sharpening of circular saws wherein no rake is desired transversely of the plane of the saw blade, the operator will advance the saw one tooth at a time, and the slide 56 will be positioned on the arcuate bar 54 as shown in FIG. 3. However, when transverse rake is desired, the saw and indexing device will be positioned somewhat as shown in FIG. 4. When thus positioned, predetermined ones of the teeth of the saw will be sharpened, after which the saw holding member 42 and slide 56 will be moved to an angle opposite that shown in FIG. 4 and others of the teeth sharpened.

Figure 9:
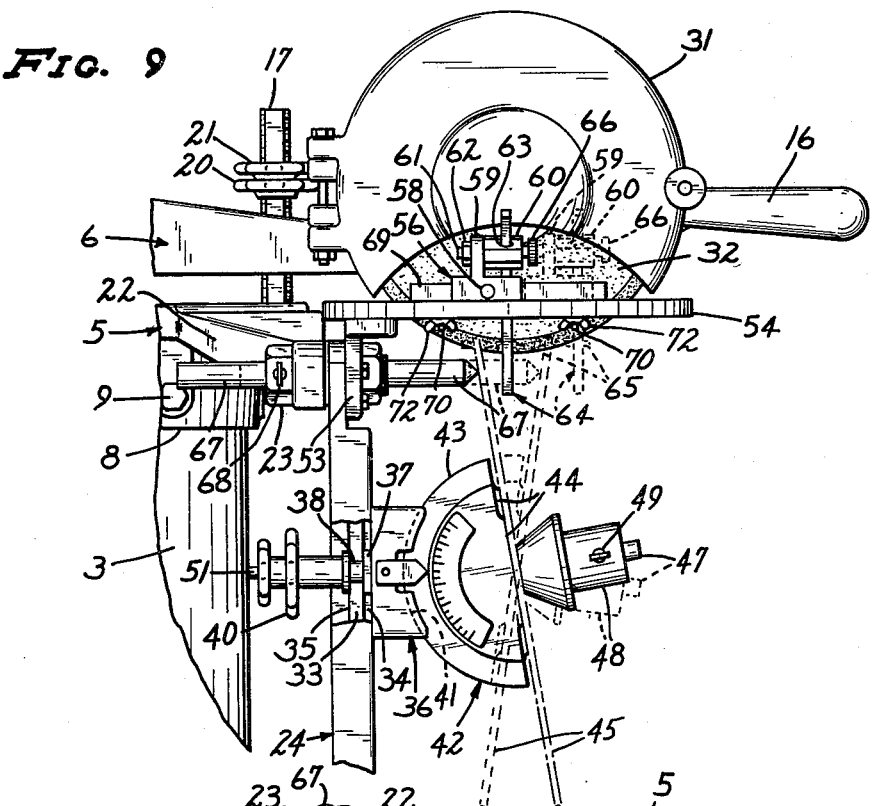
FIG. 9 is an enlarged fragmentary view corresponding to a portion of FIG. 1, but showing an alternative arrangement, some parts being broken away.
Figure 10:
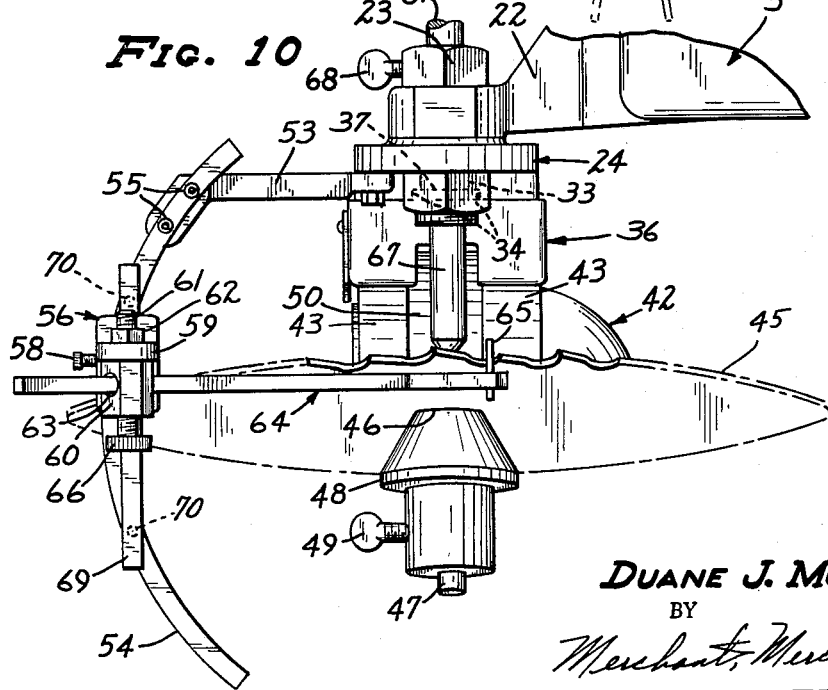
FIG. 10 is a view corresponding to FIGS. 3 and 4 but showing the arrangement illustrated in FIG. 9.

For the purpose of grinding the trailing portions of the saw teeth at the desired clearance angles, both circumferentially and transversely of the saw blade 45, the leg 24 is adjusted as desired with respect to the quadrant element 25, the carrier element 36 turned 90° and locked in position, and the saw holding member 42 adjusted to the desired angle, as shown in FIGS. 9 and 10. For the purpose of properly indexing the saw 45 when thus positioned in the machine, I provide a straight horizontally disposed mounting bar 69 that is provided with a pair of longitudinally spaced downwardly projecting threaded studs 70 that are adapted to be received in spaced apertures 71 in the arcuate bar 54. A pair of wing nuts 72 are screw threaded on the studs 70 to rigidly secure the straight mounting bar 69 on the arcuate bar 54, see particularly FIG. 9. When the bar 69 is used, the slide 56 is mounted thereon for movements in a straight line parallel to the axis of pivotal movement of the leg 24. Inasmuch as in many instances the clearance angles of the teeth are oblique to the transverse or axial dimensions of the saw blade, some of the teeth are ground on their clearance or trailing faces or edges with the blade positioned as shown by full lines in FIGS. 9 and 10, while others thereof are sharpened with the blade positioned as shown by dotted lines in FIG. 9. When the saw blade 45 is positioned as shown by full lines in FIG. 9, the slide 56 is disposed substantially as shown by full lines in FIG. 9; and, when the saw blade 45 is positioned as indicated by dotted lines in FIG. 9, the slide 56 is moved longitudinally of the mounting bar 69 and positioned substantially as shown by dotted lines in FIG. 9. It will be noted, with further reference to FIG. 9, that the stop pin 67 is utilized to support the saw blade 45 adjacent the upper teeth thereof regardless of the position of the saw blade. It will be further appreciated that the grinding wheel 32 is adapted to be rotated in a direction toward the stop pin 67.

Adjustment of the carrier element 36 longitudinally of the leg 24, permits the grinding machine to accommodate saws of a wide variety of diameters; an angular adjustment thereof on the leg 24 together with the angular adjustment of the saw holding member 42 on the carrier element 36 together with the various adjustments which may be made of the indexing member 64, enables the machine to uniformly sharpen circular saws having a wide variety of tooth forms and arrangements. Free pivotal movement of the mounting elements 60 relative to the slide 56 permits the tooth engaging element 65 to ride easily over the saw teeth as the saw is advanced, thus enabling the operator to quickly and easily advance and index the saw 45 for each tooth that is sharpened. With the use of the above described indexing means, I have been able to effect a considerable savings in time and effort in uniformly grinding circular saws including saws having special teeth of a hardness which precludes their being sharpened by the usual filing apparatus. It will be further appreciated that the above described indexing device and mounting means therefor can be used to equal advantage in machines having apparatus for holding other types of saws, such as band saws, chain saws and the like.

My invention has been thoroughly tested and found to be completely satisfactory for the accomplishment of the objectives set forth; and, while I have shown and described a preferred embodiment of my saw grinding machine and indexing means, it will be understood that the same is capable of modification without departure from the spirit and scope of the invention, as defined in the claims.

What I claim is:

1. A saw tooth grinding machine including an upright supporting structure, a circular saw carrying leg member pivotally mounted adjacent its upper end on said structure and depending therefrom for arcuate adjustment of its lower end on said structure in the plane of the saw, said saw having a pivotal support slidably adjustable longitudinally on said leg member and to extend outwardly therefrom, a power driven abrasive wheel, means mounting said abrasive wheel on said supporting structure for movements to and from grinding contact with teeth of said saw on its support, a bracket arm rigidly carried by said leg member adjacent its pivotal mounting and extending therefrom in a horizontal arcuate path about one side of the longitudinal axis of said leg member for common adjustable movements therewith, an elongated saw tooth engaging indexing finger, and a mounting member for said finger having slidable adjustment along said bracket, whereby to positively limit pivotal movement of said saw in one direction of movement on its support in all arcuate adjustments of said leg.

2. The structure defined in claim 1, in which said indexing finger is vertically swingable on a horizontal axis on its mounting member, and said finger being longitudinally adjustable in said mounting member normal to said horizontal axis irrespective of the arcuate adjustment of said mounting member on said bracket.

3. The structure defined in claim 1 in which said mounting device for said indexing finger comprises, a slide member adjustably mounted on said bracket arm, a mounting element pivotally secured to said slide member on a horizontal axis normal to the longitudinal dimension of said indexing finger, and releasable means rigidly anchoring said indexing finger to said mounting element and releasable to permit adjustment of said indexing finger in the direction of the longitudinal dimension thereof.

4. In a saw sharpening apparatus, a supporting structure, swingably mounted means on the supporting structure for adjustably mounting a pivotal saw support for movements in a direction generally longitudinally of the row of teeth on the saw and for arcuate movements normal thereto, a power driven rotary abrasive wheel mounted on said supporting structure for movements toward and away from grinding contact with the teeth of a saw on the saw mounting means, the improvement comprising a bracket rigidly mounted on said swingably mounted means extending in an arcuate path around one side of said means, a saw indexing member including a saw tooth-engaging element at one end portion thereof, and a mounting device slidably mounting said indexing member on said bracket means for swinging movements of said one end portion thereof in a direction generally normal to the direction of movement of a saw mounted on the saw mounting means, said mounting device anchoring said indexing member against movement in a direction generally longitudinally of the direction of movement of the saw, whereby to positively limit movement of the saw in one direction of said movement thereof.

5. In a saw sharpening apparatus, supporting structure including, a base member, a leg depending from said base member and pivotally secured thereto for swinging movements on a horizontal axis, means for releasably locking said leg in different positions of swinging movement thereof, means on said leg for mounting a saw for movements in a direction generally longitudinally of the row of teeth of the saw, a power driven rotary abrasive wheel mounted on said base member for movements relative thereto toward and away from grinding contact with the teeth of a saw on the saw mounting means, the axis of said abrasive wheel being disposed generally horizontally and normal to the axis of swinging movement of said leg, bracket means rigidly connected to said leg for common movements therewith, a saw tooth indexing member including a saw tooth engaging element at one end portion thereof, and a mounting device mounting said indexing member on the bracket means for swinging movement of said one end portion thereof in a direction generally normal to the direction of movement of a saw mounted on the saw mounting means, said mounting device anchoring said indexing member against movement in a direction generally longitudinally of the direction of movement of the saw, whereby to positivley limit movement of the saw in one direction of said movement thereof.

6. The structure defined in claim 5 in which said saw mounting means includes a saw holding member pivotally mounted on said leg for movements with said saw on a selected one of a pair of axes, one of said axes being parallel to the longitudinal dimension of said leg and the other of said axes being normal to the longitudinal dimension of said leg, said bracket means including a generally horizontally disposed arcuate member, the axis of which is substantially parallel to the longitudinal dimension of said leg, said mounting device being adjustably mounted on said arcuate member for movements generally longitudinally of said arcuate member.

7. The structure defined in claim 6 in which said bracket means further includes a straight horizontal mounting bar releasably mounted on said arcuate member and parallel to the axis of said swinging movement of said leg, said mounting device being adapted to be mounted selectively on said arcuate member and said mounting bar for movements longitudinally thereof.

References Cited in the file of this patent

UNITED STATES PATENTS

| | | |
|---|---|---|
| 297,566 | Bush | Apr. 29, 1884 |
| 1,781,941 | Armstrong | Nov. 18, 1930 |
| 2,607,243 | McEwan | Aug. 19, 1952 |
| 2,986,047 | McConnell | May 30, 1961 |

FOREIGN PATENTS

| | | |
|---|---|---|
| 134,441 | Australia | Sept. 27, 1949 |
| 149,795 | Great Britain | Aug. 26, 1920 |
| 285,870 | Switzerland | Jan. 16, 1953 |